US009386302B2

(12) United States Patent
Zeng et al.

(10) Patent No.: US 9,386,302 B2
(45) Date of Patent: Jul. 5, 2016

(54) AUTOMATIC CALIBRATION OF EXTRINSIC AND INTRINSIC CAMERA PARAMETERS FOR SURROUND-VIEW CAMERA SYSTEM

(71) Applicant: GM GLOBAL TECHNOLOGY OPERATIONS LLC, Detroit, MI (US)

(72) Inventors: Shuqing Zeng, Sterling Heights, MI (US); Wende Zhang, Troy, MI (US); Jinsong Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 14/283,518

(22) Filed: May 21, 2014

(65) Prior Publication Data

US 2015/0341629 A1 Nov. 26, 2015

(51) Int. Cl.

| | |
|---|---|
| ***H04N 17/00*** | (2006.01) |
| ***G06K 9/52*** | (2006.01) |
| ***G06T 7/00*** | (2006.01) |
| ***G06K 9/00*** | (2006.01) |

(52) U.S. Cl.

CPC ................ *H04N 17/002* (2013.01); *G06K 9/52* (2013.01); *G06T 7/0018* (2013.01); *H04N 17/00* (2013.01); *G06K 9/00791* (2013.01); *G06T 2207/30264* (2013.01)

(58) Field of Classification Search

CPC ........ H04N 17/002; G06T 7/004; G06K 9/52; G06K 9/00791

See application file for complete search history.

(56) References Cited

U.S. PATENT DOCUMENTS

| | | | | |
|---|---|---|---|---|
| 7,307,655 | B1 * | 12/2007 | Okamoto | G06K 9/00791 348/222.1 |
| 2001/0012985 | A1 * | 8/2001 | Okamoto | G06T 7/0018 702/94 |
| 2010/0253784 | A1 * | 10/2010 | Oleg | G06T 7/0018 348/187 |
| 2011/0024611 | A1 * | 2/2011 | Cunningham | G01V 5/0075 250/252.1 |
| 2014/0085409 | A1 * | 3/2014 | Zhang | H04N 5/23238 348/36 |
| 2015/0042799 | A1 * | 2/2015 | Zhang | H04N 7/18 348/148 |
| 2015/0145965 | A1 * | 5/2015 | Livyatan | B60R 1/00 348/47 |

OTHER PUBLICATIONS

Davide Scaramuzza, et al., A toolbox for Easily Calibrating Omnidirectional Cameras, Proceedings of the 2006 IEEE/RSJ, International Conference on Intelligent Robots and Systems, Oct. 9-15, 2006, Beijing China, pp. 5695-5701.

Juho Kannala, et al., A generic Model and Calibration Method of Conventional, Wide-Angle, and Fish Eye Lenses, http://www.ee.oulu.fi/~jannala/publications/tpami2006.pdf.

* cited by examiner

*Primary Examiner* — Brian Yenke

(57) ABSTRACT

A method of calibrating multiple vehicle-based image capture devices of a vehicle. An image is captured by at least one image capture device. A reference object is identified in the captured image. The reference object has known world coordinates. Known features of the vehicle are extracted in the captured image. A relative location and orientation of the vehicle in world coordinates is determined relative to the reference object. Each of the multiple image capture devices is calibrated utilizing intrinsic and extrinsic parameters of the at least one image capture device as a function of the relative location and orientation of the vehicle in world coordinates.

18 Claims, 5 Drawing Sheets

Input Data/Image Fromon-board Sensors (e.g., surround view cameras) — 80

Identify The Reference Objects (In World Coordinates) — 81

Identify the Vehcile (Known Parts, Body Boundaries) — 82

Compute Relative Location And Orientation — 83

Vehicle Location/Pose in world Coordiates — 84

96 98 91 93 102 104 90 92 100 94

AUTOMATIC CALIBRATION OF EXTRINSIC AND INTRINSIC CAMERA PARAMETERS FOR SURROUND-VIEW CAMERA SYSTEM

BACKGROUND OF INVENTION

An embodiment relates to vehicle imaging systems.

Vision based imaging system utilized image capture devices to detect objects exterior for various vehicle applications including collision avoidance systems, automated cruise control, and parking assistance. If more than one camera is being used, and if the relative positions and poses are not known between each of the respective cameras, then calibration between the respective cameras cannot be obtained. As a result, cameras that have unknown relative positioning and poses to one another may result in misalignment in overlapping zones between image capture devices and misaligned image stitching.

SUMMARY OF INVENTION

An advantage of an embodiment is a calibration of multiple cameras of a surround view system that can be utilized on an assembly line. The technique described herein provides an approach for autonomously estimating extrinsic camera parameters and for refining intrinsic parameters of the cameras by merging multiple views of pre-defined patterns. The technique utilizes a spatial view integration where multiple patterned displays are displayed surrounding the vehicle and each respective camera captures at least one patterned display. The vehicle obtains images at predetermined check points with known distances and positions relative to the patterned display. Since the vehicle is viewed as a rigid body with the cameras treated as a rigid body as well, world coordinates are correlated with camera coordinates. The camera coordinates are correlated with the vehicle coordinates. As a result, the vehicle coordinates can be correlated with the world coordinates which allow the refinement of camera extrinsic parameters and the estimation of relative extrinsic parameters for calibration of the multi-camera system.

An embodiment contemplates a method of calibrating multiple vehicle-based image capture devices of a vehicle. An image is captured by at least one image capture device. A processor identifies a reference object in the captured image. The reference object includes known world coordinates. The identification of the reference object is used to correlate coordinates of the image capture device to world coordinates. A location and orientation of the vehicle is determined by the processor. The location and orientation of the vehicle is used to correlate coordinates of the vehicle to world coordinates. The processor correlates the vehicle coordinates to the image capture device coordinates as a function of the relationship between the world coordinates and the vehicle coordinates and the relationship between the world coordinates and the image capture device coordinates. The at least one image capture device is calibrated utilizing intrinsic parameters and extrinsic parameters of the at least one image capture device as a function of the relationship of the vehicle coordinates to the image capture device coordinates.

DETAILED DESCRIPTION

Figure 1:
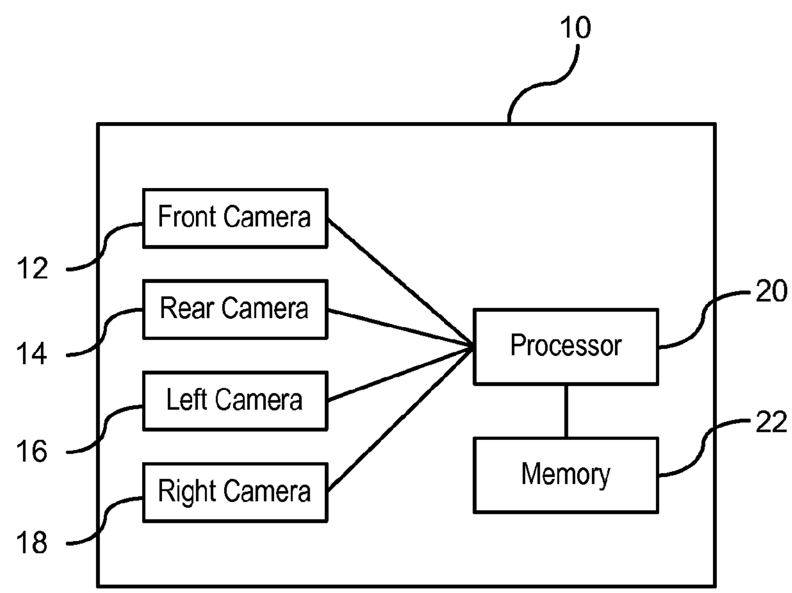
FIG. 1 illustrates a block diagram of an object detection system that is used for collision avoidance or object detection systems.

FIG. 1 illustrates a block diagram of an object detection system that is used for collision avoidance or object detection systems. The vehicle 10 includes a front-facing image capture device 12, a left-facing image capture device 14, a right-facing image capture device 16, and a rear-facing image capture device 18. Each of the image capture devices hereinafter will be referred to as cameras, however, it should be understood that the image capture device is not limited to a camera. Each of the cameras captures a region exterior of the vehicle which is provided to a vehicle processor 20. The processor 20 utilizes the capture images for detecting objects as well as viewing objects exterior of the vehicle for determining their proximity to the vehicle 10. The detection of objects can be used by various vehicle applications including, but not limited to, collision alert, automated cruise control, and driver vision enhancement. A memory 22 may be used to store data that is used to analyze the images.

For vehicles that are equipped with more than one camera the relative position and pose between one another must be known in order to have alignment correspondence between each camera so that the data can be cooperatively used when processed. If the cameras are not aligned to one another, the data will be skewed when the data is analyzed, and accuracy as to the location of the detected objects will be inaccurate resulting in inaccurate outputs of the vehicle applications utilizing the input data. The procedure described herein provides a less complex approach for camera alignment and synchronization.

Figure 2:
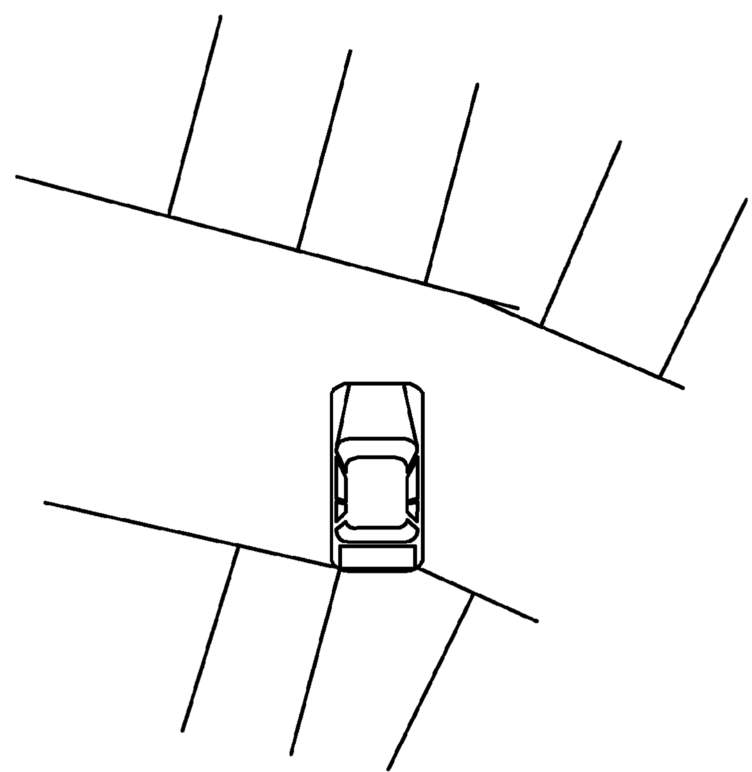
FIG. 2 is an exemplary top-view illustration of an image stitched together using multiple un-calibrated cameras.

FIG. 2 illustrates a top-down view illustration of an image stitched together using images obtained by the surrounding cameras. The scene is an exemplary illustration of a parking lot having a straight aisle with parking spaces evenly spaced on each side of the aisle. Each of the cameras capturing the images are un-calibrated, and as a result, as shown in the image, the various scenes as captured by the cameras will not be aligned when stitched together. As a result, the scene is skewed with various parking space lines not being properly aligned.

To properly align the surround view cameras, camera coordinates are correlated with vehicle coordinates, which in turn, the vehicle coordinates are correlated with the world coordinates. As a result, the camera coordinates may be correlated with vehicle coordinates which allow proper alignment of the cameras since each camera and the vehicle are calibrated to a common and known reference having a fixed position in world coordinates. To do so, a camera is initially calibrated in world coordinates. The relative pose and position of the vehicle is thereafter calibrated in real world coordinates. Since the vehicle and the camera mounted on the vehicle are seen as a rigid body, the camera pose and camera position may be calibrated relative to the mounting vehicle. The final result is the camera calibration in vehicle coordinates.

Figure 3:
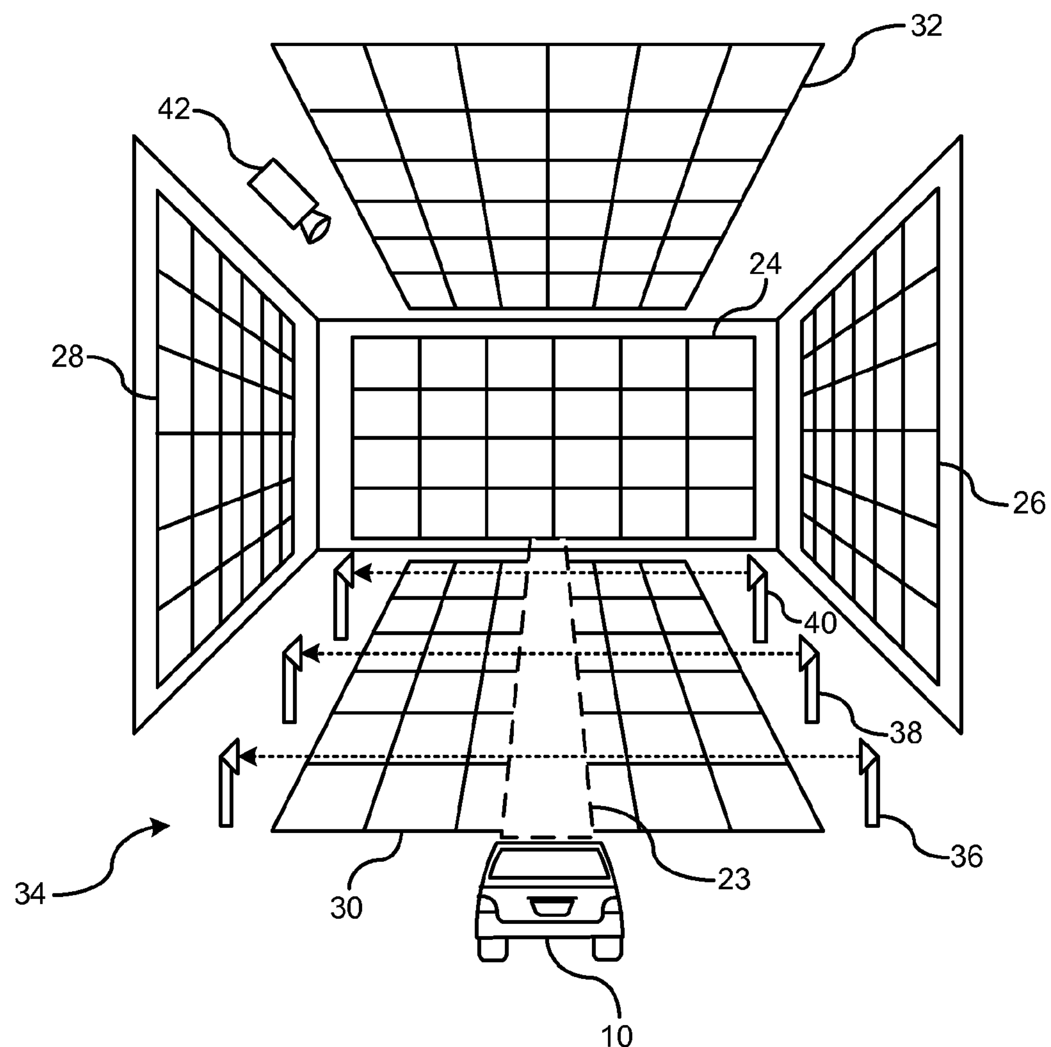
FIG. 3 illustrates an exemplary multi-patterned display for calibrating multiple imaging devices.

FIG. 3 illustrates the vehicle 10 traversing across an assembly line 23 or similar. When moved to a respective station on the assembly line, a plurality of patterned displays is put in place surrounding the vehicle. The plurality of patterned displays may include a forward facing display 24, a right-side facing display 26, a left-side facing display 28, floor-based facing display 30, and a ceiling-based facing display 32. Although not shown in this exemplary illustration, a rear facing pattern display is present and is moved into position so that a rear-facing image capture device can capture a patterned display rear of the vehicle and possibly other patterned displays (e.g., sides and bottom). Preferably, each of the patterned displays includes a pattern having identifiable edges that distinguish the respective patterns distinctly, such as a checkered floorboard pattern. The pattern represents a grid system wherein the where edges distinguish the alternating patterns from one another and the intersecting lines of the edges designate identifiable location points in the grid.

A plurality of checkpoint devices 34 detects the position of the vehicle along a track of the assembly line. The checkpoint devices 34 may include a transmitter and an associated receiver. The transmitter may include an LED laser and the receiver may include a photo detector for detecting the light waves transmitted by the transmitter. It should be understood that the LED laser and the photo detector are only examples of a transmitter-receiver combination and that other transmitters and receivers may be used without deviating from the scope of the invention. Furthermore, the plurality of checkpoint devices may include a first checkpoint device 36, a second checkpoint device 38, and a third checkpoint device 40 for deterring the position along the vehicle assembly line.

At least one ceiling mounted camera 42 may be used for capturing images of the vehicle while traversing the assembly line. The captured images may be used to detect an orientation of the vehicle as it moves along the assembly line.

Figure 4:
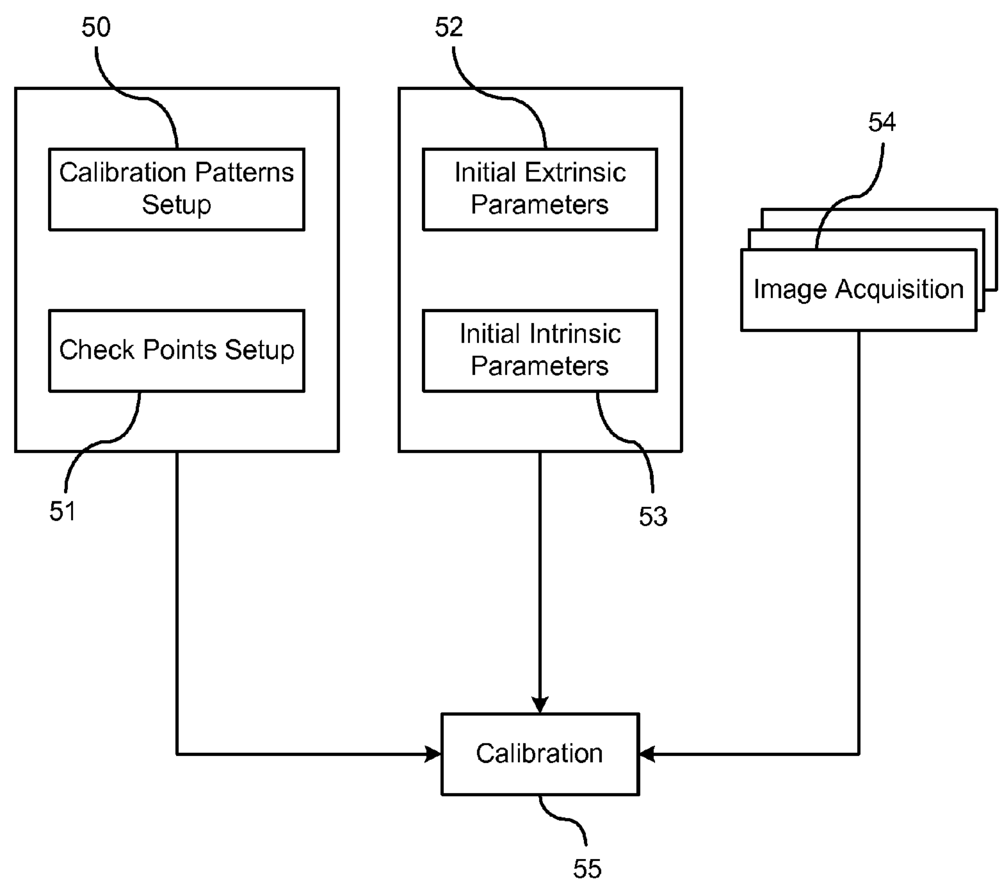
FIG. 4 is a flowchart of a method for calibrating multiple vehicle mounted cameras.

FIG. 4 illustrates a block diagram for calibrating the vehicle mounted cameras in real world coordinates by refining intrinsic parameters and estimating extrinsic parameters of each of the cameras.

In block 50, calibration patterns are set up which includes displaying patterned displays surrounding the vehicle which are at least partially captured by the plurality of cameras. Each of the pattern displays are set with known positions. The concept is to position the patterned displays at a known distance and position from each of the respective checkpoints.

In block 51, each of the check points are setup. Each checkpoint includes a transmitter and receiver for detecting when a vehicle reaches a respective checkpoint position. For example, each of the transmitting IR LED devices may transmit a light beam across the assembly line to a receiver such as an IR photo detector. When the light beam is interrupted, then determination is made that the vehicle has reached that respective checkpoint location. The distance from the checkpoint to the various patterned displays is known. Moreover, the since the design of the vehicle is known with known locations of the vehicle cameras mounted therein, then distances from the camera to each of the patterned displays should also be know or at least initially estimated. That is, through CAD data and other vehicle drawings, a geometry (e.g., shape) and dimensions of the vehicle are known. By combining this information with the vehicle pose (e.g., heading angle and offset), a determination is made which location of the vehicle first interrupts the IR beam (e.g. front bumper at the IR beam height). In addition, through design, the camera mounting locations are approximately known as there may be some slight misalignment or offsets from what the CAD data provides. By utilizing these two factors, the distances and relative locations from the cameras to each of the patterned displays are known or at least initially estimated.

In block 52, initial extrinsic parameters of the camera in world coordinates are determined. Extrinsic camera parameters relate to the rotation and position of the camera relative to the pattern displays or other landmarks. Extrinsic parameters are often represented by [R,t] which denotes the coordinate system transformations from three-dimensional world coordinates to three-dimensional camera coordinates. Extrinsic parameters define a position of a camera center and the camera's pose in world coordinates. The translation t a position of the origin of the world coordinate system expressed in coordinates of the camera-centered coordinate system.

In block 53, initial intrinsic parameters of the camera are determined. Intrinsic parameters relate to linear and non-linear intrinsic parameters. Linear intrinsic parameters include focal length, image format, and principal points of focus of the image capture device. Non-linear intrinsic parameters relate to a distortion of the camera lens. Distortion results from the camera lens having a wide field-of-view such as a fisheye camera, or narrow field-of-view.

In block 54, image acquisition is initiated. Each of the vehicle cameras captures images of plurality of patterned displays when a determination is made that the vehicle has reached a respective checkpoint. Each of the cameras captures a respective image exterior of the vehicle which preferably includes a portion of at least one patterned display. Landmarks in the patterned display are used to determine the relative position to of the camera to its surrounding environment.

In addition, other data from other sensing devices may be used to determine the vehicle pose in real world coordinates or may be cooperatively used with the in-vehicle camera. The at least one top-down image captures an image of the vehicle from the overhead position. The orientation of the vehicle relative to the assembly line is determined in which a vehicle orientation (e.g., heading angle) in position (e.g., position/lateral offset on the assembly line) are used to estimate the transformation from the vehicle coordinates to the world coordinates. In combining the estimated camera parameters in real world coordinates and the transformation from the vehicle coordinates to the world coordinates, camera parameters in vehicle coordinates may be calculated which is the extrinsic calibration objective.

In block 55, camera calibration is initiated for each of the vehicle mounted cameras. Given the calibration patterns setup, the determined initial intrinsic and extrinsic estimates, vehicle rigid body constraints, and the images captured at each of the checkpoint distances, camera calibration is performed. The camera intrinsic and extrinsic parameters are determined at each checkpoint and such parameters are refined based on measurements at all the checkpoints using fixed multi-camera relative positions and checkpoint distance constraints. Different techniques identifying the misalignment of the vehicle in terms of real world coordinates is discussed below. One such technique that can be applied for multi-measure camera calibration is described in a co-pending application entitled "Wide FOV Camera Image Calibration And De-Warping" having an application Ser. No. 13/843,978 and a filing date of Mar. 15, 2013.

Figure 5:
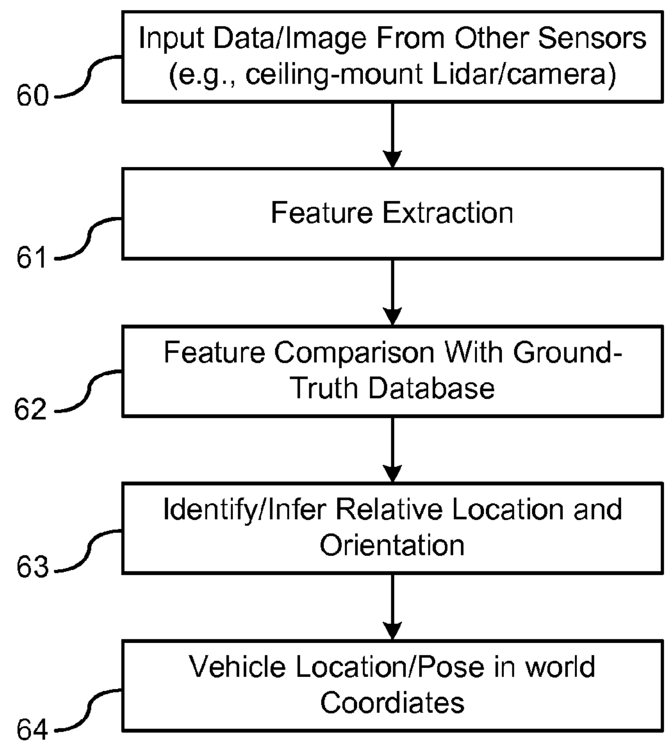
FIG. 5 is a first embodiment of a flowchart of a method for aligning a vehicle in world coordinates.
Figure 6:
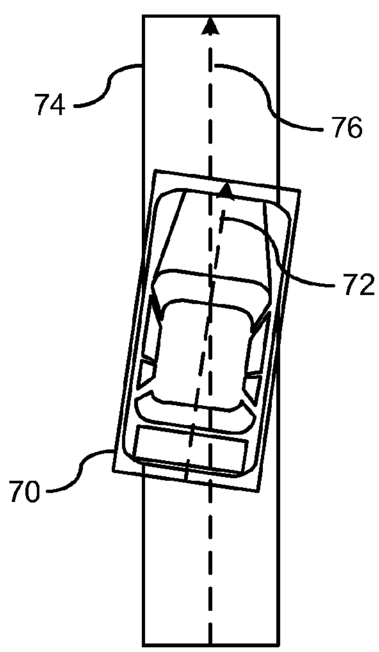
FIG. 6 is an exemplary top-down view captured by a ceiling mounted image capture device.

FIGS. 5 and 6 will be discussed cooperatively for illustrating a technique for estimating vehicle pose in world coordinates. Referring to block 60 of FIG. 5, input data is obtained from sensors, such as the ceiling-mount Lidar/camera(s). The input data includes a top-down image of the vehicle in reference to the assembly line as shown in FIG. 6. In a perfect scenario, the vehicle would be perfectly in-line with the assembly line and the world coordinates of the vehicle pose could easily be obtained; however, due to tooling errors, wearing of fixtures over time, and other factors, misalignment of the vehicle in relation to the assembly line may be present.

In block 61, feature extraction of the vehicle is identified from the top-down view. Feature extraction includes identifying lines and other notable features that can be used to identify a pose of the vehicle. Identifying lines may assist in performing vehicle boundary detection which identifies the outer boundaries of the vehicle so that the profile of the vehicle may be identified in the captured images. Another approach is to provide templates of the vehicle for applying template matching. Given a template of the vehicle, features are identified to match the template and profile of the vehicle to identify the pose of the vehicle.

In block 62, the detected features (e.g., vehicle boundaries) are compared with a ground-truth database. A ground-truth database comparison shows the respective features of the vehicle (e.g., vehicle boundaries) in comparison to the true orientation and layout of the ground. As shown in FIG. 6, a vehicle boundary is represented generally by element 70 having a general longitudinal axis 72. The layout of the ground truth is represented generally by 74 and has a general longitudinal axis 76. The ground truth may refer to a vehicle top-down view boundary profile or a template from vehicle CAD data. The ground truth orientation (e.g., heading angle) is assumed to be in line with the assembly line orientation and is represented by the longitudinal axis 76.

In block 63, in response to the comparison of the vehicle features and the ground-truth, a relative location and orientation of the vehicle are identified.

In block 64, knowing the location of the vehicle when the vehicle reaches a respective checkpoint, and based on the relative location and orientation of the vehicle as determined in block 63, a vehicle location and pose in world coordinates can be identified. The vehicle coordinates can be correlated with the world coordinates. Moreover, since the vehicle is a rigid body having cameras mounted thereon, then camera coordinates can be correlated to the world coordinates. Moreover, the vehicle coordinates can be correlated to the image capture device coordinates. As a result, each of the multiple image capture devices can be calibrated utilizing intrinsic parameters and extrinsic parameters of each image capture device as a function of the relation of the vehicle coordinates to the image capture device coordinates.

Figure 7:
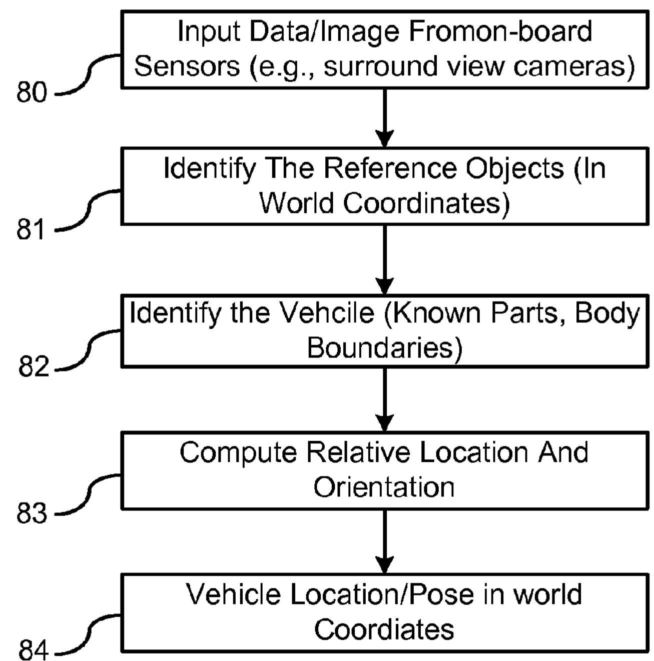
FIG. 7 is a second embodiment of a flowchart of a method for aligning a vehicle in world coordinates.
Figure 8:
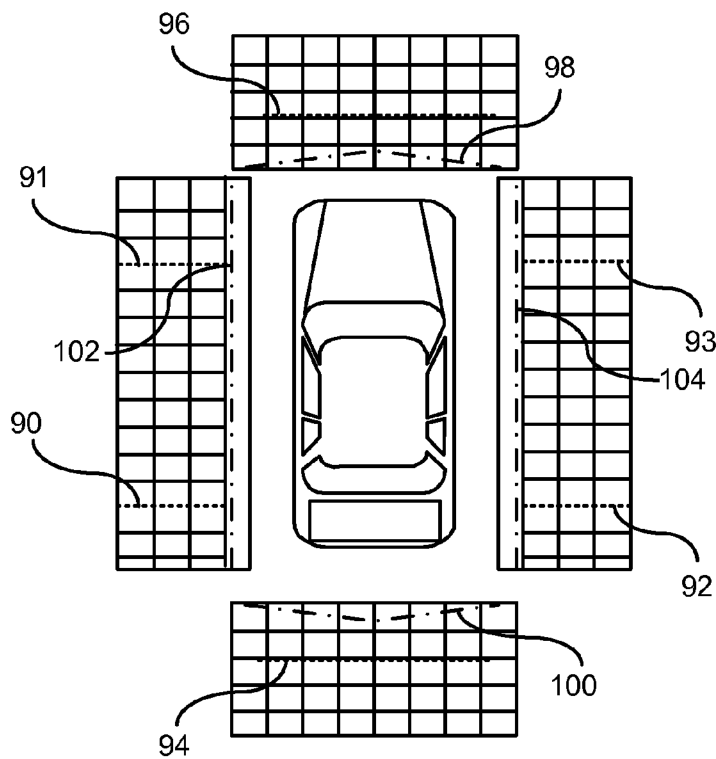
FIG. 8 is an exemplary illustration of images captured by surrounding vehicle image capture devices.

FIGS. 7 and 8 will be discussed cooperatively for illustrating another technique for estimating vehicle pose in world coordinates. In block 80, an input image is captured using vehicle on-board sensors. Images are captured from each camera mounted on the vehicle for obtaining a surrounding view of the vehicle. The images captured are typically distorted images if captured by a wide angle viewing lens of an image capture device. It should be understood that each of the cameras are wide field-of-view cameras and that the wide field-of-view images typically include a distorted or warped image. A portion of the image that includes the patterned design or other reference object is isolated and is translated into a planar image having no distortion. Various techniques may be used to de-warp the wide field-of-view image. The images may then be processed through a de-warping technique for illustrating a planar image such as the top down views shown in FIG. 8. As shown in FIG. 8, the images obtained from the various cameras and the various portions of the image are focused on a respective region in the image for determining reference objects in relation to the vehicle.

The reference objects are stationary references having known world coordinates. The concept is to relate the vehicle which is a rigid body to a known reference. Once the correlation between the vehicle and the references are known, camera coordinates can be correlated with the references based on the references known coordinates. As a result, each of the cameras can be calibrated to one another as a result of the correlation with the world coordinates.

In block 81, reference objects are identified in world coordinates. As shown in FIG. 8, landmark boundaries within the patterned grids are identified. In FIG. 8, the checkered board pattern in each of the views represents the same checkered board pattern captured by each of the different view-facing image capture devices. Various landmarks are identified within each view such as a boundary of a patterned grid, a respective featured line in a patterned grid, or a vehicle boundary may be utilized. In this example, reference landmarks in world coordinates are represented by elements 90-96, wherein vehicle boundary landmarks representing vehicle coordinates are represented by 98-104. In regards to the landmarks identified in the checkered floorboard, various exemplary landmarks can be used. Exemplary landmarks include may include points on the captured checkered board pattern. Points in the pattern where each of the lines intersects. Each of the points and the squares in the checker board pattern are labeled and the location of each point is identified in both the image plane and the object space in world coordinates. Elements 90-96, in addition to representing landmarks, may also illustrate overlapping regions of the plurality of checkered pattern displays where a respective pattern is seen by two of the four cameras.

In block 82, vehicle features and their boundaries captured by the respective cameras are identified. Vehicle features may include a known part, such as a front bumper boundary 98, a rear bumper boundary 100, a left side door boundary 102, and right side door boundary 104.

In block 83, the vehicle features determined in block 82 are compared with the associated reference objects determined in block 81. The relative location and orientation of the vehicle relative to the reference objects are determined.

In block 84, knowing the location of the vehicle when the vehicle reaches a respective checkpoint, and based on the relative location and orientation of the vehicle boundaries as determined in block 83, a vehicle location and pose in real world coordinates can be identified. Each of the points in the checker board pattern for all of the images is identified based on the location of those points, and the calibration of the camera is obtained based on known world coordinates. As a result, the vehicle coordinates can be correlated with the world coordinates. Moreover, since the vehicle is a rigid body having cameras mounted thereon, then camera coordinates which are correlated with the vehicle coordinates by virtue of the cameras mounted thereon, can be correlated to the world coordinates. As a result, calibration of camera intrinsic and extrinsic parameters can be estimated and refined for calibrating each of the cameras based its correlation to vehicle coordinates.

While certain embodiments of the present invention have been described in detail, those familiar with the art to which this invention relates will recognize various alternative designs and embodiments for practicing the invention as defined by the following claims.

What is claimed is:

1. A method of calibrating multiple vehicle-based image capture devices of a vehicle, the method comprising the steps of:

capturing an image by at least one image capture device;

identifying, by a processor, a reference object in the captured image, the reference object having known world coordinates, the identification of the reference object is used to correlate coordinates of the image capture device to world coordinates;

determining a location and orientation of the vehicle, by the processor, the location and orientation of the vehicle used to correlate coordinates of the vehicle to world coordinates, wherein determining the location and orientation of the vehicle includes:

capturing a top-down view image of the vehicle on an assembly line by an overhead non-vehicle-based image capture device;

applying feature extraction on the vehicle for detecting a vehicle boundary;

comparing an orientation of the assembly line with the vehicle boundary; and identifying the relative location and orientation of the vehicle relative to the assembly line;

correlating, by the processor, the vehicle coordinates to the image capture device coordinates as a function of the relationship between the world coordinates and the vehicle coordinates and the relationship between the world coordinates and the image capture device coordinates;

calibrating the at least one image capture device utilizing intrinsic parameters and extrinsic parameters of the at least one image capture device as a function of the relationship of the vehicle coordinates to the image capture device coordinates.

2. The method of claim 1 wherein the identifying a relative location and orientation between the assembly line and the vehicle boundary comprises the following steps:

identifying a longitudinal axis of the assembly line;

identifying a longitudinal axis of the vehicle;

comparing the longitudinal axis of the assembly line with the longitudinal axis of the vehicle for determining an orientation between the assembly line and the vehicle.

3. The method of claim 2 where template matching is applied for determining an orientation of the assembly line.

4. The method of claim 3 wherein template matching is applied for determining the vehicle boundary and vehicle orientation.

5. The method of claim 1 wherein feature extraction of an exterior panel of the vehicle is applied for determining the vehicle boundary.

6. The method of claim 1 wherein applying feature extraction on the vehicle for detecting the vehicle boundary includes a feature comparison with a ground-truth database.

7. The method of claim 1 wherein adjusting the extrinsic parameters includes adjusting a rotation and translation of a respective image capture device based on the determined position and pose relative to the patterned display.

8. The method of claim 1 wherein refining intrinsic parameters of a respective image capture device includes refining a focal length and image center of the image capture device.

9. The method of claim 1 wherein refining intrinsic parameters of a respective image capture device includes refining a distortion from a lens of the image capture device.

10. A method of calibrating multiple vehicle-based image capture devices of a vehicle, the method comprising the steps of:

capturing images exterior of the vehicle by a plurality of vehicle-based image capture devices, wherein each vehicle-based image capture device captures a respective reference object, wherein each respective reference object includes a patterned display, and wherein known features of the vehicle include a respective vehicle boundary;

identifying, by a processor, a reference object in the captured image, the reference object having known world coordinates, the identification of the reference object is used to correlate coordinates of the image capture device to world coordinates;

determining a location and orientation of the vehicle, by the processor, the location and orientation of the vehicle used to correlate coordinates of the vehicle to world coordinates;

correlating, by the processor, the vehicle coordinates to the image capture device coordinates as a function of the relationship between the world coordinates and the vehicle coordinates and the relationship between the world coordinates and the image capture device coordinates;

calibrating the at least one image capture device utilizing intrinsic parameters and extrinsic parameters of the at least one image capture device as a function of the relationship of the vehicle coordinates to the image capture device coordinates.

11. The method of claim 10 wherein each image capture device captures a respective vehicle boundary.

12. The method of claim 11 further comprising the steps of:

traversing the vehicle past the plurality of patterned displays;

each image capture device capturing an image of at least one patterned display exterior of the vehicle when the vehicle reaches a respective checkpoint, the respective checkpoint being at a position that is a known distance from each of the plurality of patterned displays:

identifying, by a processor, common landmarks of the patterned display in each respective captured image;

identifying, by a processor, vehicle boundaries of the vehicle in each respective captured image;

determining a relative location and orientation of the vehicle relative to the common landmarks.

13. The method of claim 12 wherein traversing the vehicle across the patterned display includes traversing the vehicle across a plurality of checker board patterns, wherein each respective vehicle-based image capture device captures at least of a portion of a at least one patterned display.

14. The method of claim 12 wherein identifying common landmarks within the patterned display includes identifying corners of an outer boundary of the patterned display.

15. The method of claim 12 wherein identifying common landmarks within the patterned display includes identifying common edges that distinguish patterns within the patterned display among each of the captured images.

16. The method of claim 12 wherein identifying common landmarks within the patterned display includes identifying common points generated by common intersecting edges within the patterned display.

17. The method of claim 11 wherein a plurality of checkpoints are provided, wherein images of at least one patterned display is captured at each respective checkpoint.

18. The method of claim 17 wherein images of at least one of the patterned displays are captured at each respective checkpoint, wherein calibration is performed utilizing each of the images captured at each respective checkpoint by refining intrinsic parameters and extrinsic parameters of the image capture devices a function of the relationship of the vehicle coordinates to the image capture device coordinates.

* * * * *